United States Patent
Yu (10) Patent No.: US 9,576,203 B2
(45) Date of Patent: Feb. 21, 2017

(54) DEVICES, SYSTEMS, AND METHODS FOR KNOWLEDGE-BASED INFERENCE FOR MATERIAL RECOGNITION

(71) Applicant: CANON KABUSHIKI KAISHA, Tokyo (JP)

(72) Inventor: Jie Yu, San Jose, CA (US)

(73) Assignee: Canon Kabushiki Kaisha, Tokyo (JP)

(*) Notice: Subject to any disclaimer, the term of this patent is extended or adjusted under 35 U.S.C. 154(b) by 107 days.

(21) Appl. No.: 14/699,344

(22) Filed: Apr. 29, 2015

(65) Prior Publication Data

US 2016/0321505 A1    Nov. 3, 2016

(51) Int. Cl.
  *G06K 9/00* (2006.01)
  *G06K 9/46* (2006.01)
  *G06K 9/62* (2006.01)

(52) U.S. Cl.
  CPC .............. *G06K 9/00771* (2013.01); *G06K 9/46* (2013.01); *G06K 9/6201* (2013.01)

(58) Field of Classification Search
  CPC .............. G06K 9/00624–9/00852; G06K 9/46; G06K 9/6201
  See application file for complete search history.

(56) References Cited

U.S. PATENT DOCUMENTS

| | | | | |
|---|---|---|---|---|
| 7,062,085 B2* | 6/2006 | Luo | | G06K 9/38 382/165 |
| 8,805,088 B1* | 8/2014 | Mesolongitis | | G06T 7/408 348/135 |
| 2006/0018566 A1* | 1/2006 | Coleman | | G06K 9/0063 382/312 |
| 2006/0153469 A1* | 7/2006 | Gallagher | | G06F 17/30265 382/254 |
| 2006/0253491 A1 | 11/2006 | Gokturk | | |
| 2007/0160294 A1 | 7/2007 | Asano | | |
| 2007/0297683 A1* | 12/2007 | Luo | | G06K 9/00664 382/224 |
| 2009/0208106 A1* | 8/2009 | Dunlop | | G06K 9/00664 382/173 |
| 2010/0008540 A1 | 1/2010 | Shet | | |
| 2010/0260438 A1* | 10/2010 | Morikawa | | G06T 11/60 382/284 |
| 2011/0243450 A1* | 10/2011 | Liu | | G06K 9/00577 382/190 |

(Continued)

OTHER PUBLICATIONS

Sean Bell et al., Opensurfaces: A Richly Annotated Catalog of Surface Appearance, SIGGRAPH, Jul. 2013.

(Continued)

*Primary Examiner* — Sean Motsinger
(74) *Attorney, Agent, or Firm* — Canon U.S.A., Inc. IP Division (57) ABSTRACT

Systems, devices, and methods for material recognition extract one or more features from a patch in an image of a scene; generate an initial prediction of a material category of the patch from candidate material categories based on the one or more features; identify a scene in the image; identify one or more objects in the image; obtain a first relationship model of two or more of the one or more features, the candidate material categories, the one or more objects, and the scene; and make a refined prediction of the material category of the patch based on the initial prediction of the material category and on the first relationship model.

17 Claims, 9 Drawing Sheets

(56) References Cited

U.S. PATENT DOCUMENTS

| | | | | |
|---|---|---|---|---|
| 2012/0203764 | A1* | 8/2012 | Wood | G06F 17/30247 707/722 |
| 2012/0207346 | A1 | 8/2012 | Kohli | |
| 2012/0219210 | A1 | 8/2012 | Ding | |
| 2013/0259390 | A1* | 10/2013 | Dunlop | G06K 9/00718 382/224 |
| 2014/0168421 | A1* | 6/2014 | Xu | G01J 3/513 348/135 |
| 2014/0267301 | A1 | 9/2014 | Yang | |
| 2015/0070703 | A1* | 3/2015 | Tin | B07C 5/00 356/445 |
| 2015/0144537 | A1* | 5/2015 | Skaff | G06N 7/005 209/577 |
| 2015/0302269 | A1* | 10/2015 | Son | G06K 9/4647 382/170 |
| 2015/0363409 | A1* | 12/2015 | Wood | G06F 17/30058 707/738 |
| 2015/0371107 | A1* | 12/2015 | Skaff | G06F 17/30256 382/197 |

OTHER PUBLICATIONS

Christopher M. Bishop, Pattern Recognition and Machine Learning, Springer, 2006.

D. Crandall et al., Composite Models of Objects and Scenes for Category Recognition, CVPR 2007, Jun. 2007.

Trevor Darrell, Learning Representations for Real-world Recognition, Jul. 2010.

M. Heikkila et al., A texture-based method for modeling the background and detecting moving objects, IEEE Transactions on Pattern Analysis and Machine Intelligence, 28(4):657-662, Apr. 2006.

Diane Hu et al., Toward robust material recognition for everyday objects, BMVC, Sep. 2011.

Li-Jia Li et al., What, where and who? Classifying events by scene and object recognition, ICCV 2007, Oct. 2007.

Li-Jia Li et al., Objects as Attributes for Scene Classification, ECCV 2010, Sep. 2010.

Xin Li et al, An Object Co-occurrence Assisted Hierarchical Model for Scene Understanding, BMVC 2012, Sep. 2012.

Renqiang Min, A Survey on Context-Based Computer Vision Systems, Department of Computer Science, University of Toronto, 2006.

K. Murphy et al., Using the Forest to See the Trees: A Graphical Model Relating Features, Objects, and Scenes, NIPS, Jan. 2004.

Devi Parikh et al., From Appearance to Context-Based Recognition: Dense Labeling in Small Images, CVPR 2008, Jun. 2008.

J. Ruiz-Sarmiento et al., Mobile Robot Object Recognition through the Synergy of Probabilistic Graphical Models and Semantic Knowledge, Cognitive Robotics, Aug. 2014.

Gabriel Schwartz et al., Visual Material Traits: Recognizing Per-Pixel Material Context, in Proc. of Color and Photometry in Computer Vision, Dec. 2013.

Lavanya Sharan et al., Recognizing Materials Using Perceptually Inspired Features, Int J Comput Vis (2013) 103:348-371, Feb. 2013.

J. Shotton et al., TextonBoost: Joint Appearance, Shape and Context Modeling for Multi-Class Object Recognition and Segmentation, Computer Vision—ECCV 2006, May 2006.

Amit Singhal et al., Probabilistic Spatial Context Models for Scene Content Understanding, Proc. IEEE Int'l Conf. Computer Vision and Pattern Recognition, vol. 1, pp. 235-241, Jun. 2003.

Southwest Research Institute, Ontology-Based Object Recognition, downloaded from http://www.swri.org/4org/d10/msd/automation/ontology.htm, on Jan. 16, 2015.

Antonio Torralba et al., Context-based vision system for place and object recognition, Intl. Conf. Computer Vision, Oct. 2003.

Erik Van Dop, Multi-sensor object recognition: The case of electronics recycling, Mar. 1999.

Yair Weiss et al., Correctness of Belief Propagation in Gaussian Graphical Models of Arbitrary Topology, Jun. 1999.

Zhe Zhao et al., Attribute Based Object Recognition by Human Language (Extended Abstract), May 2014.

* cited by examiner

Model 1

⋮

Model x

DEVICES, SYSTEMS, AND METHODS FOR KNOWLEDGE-BASED INFERENCE FOR MATERIAL RECOGNITION

BACKGROUND

Technical Field

This description generally relates to material recognition.

Background

The recognition of materials (e.g., metal, plastic, ceramic, fabric, paint) may be useful in many research and industrial applications, such as remote sensing, food inspection, mineralogy, and recycling. However, some techniques that recognize materials require physical contact with the sample, which can limit the applications that these techniques can be used for. The optical recognition of materials in a sample may be useful in applications where contact is not possible. Also, the optical recognition of materials in a sample may simplify the design of devices and systems that could also use contact to recognize the materials.

SUMMARY

In one embodiment, a method comprises extracting one or more features from a patch in an image of a scene; generating an initial prediction of a material category of the patch from candidate material categories based on the one or more features; identifying a scene in the image; identifying one or more objects in the image; obtaining a first relationship model of two or more of the one or more features, the candidate material categories, the one or more objects, and the scene; and generating a refined prediction of the material category of the patch based on the initial prediction of the material category and on the first relationship model.

In one embodiment, a computing device comprises one or more computer-readable media and one or more processors that are coupled to the one or more computer-readable media and that are configured to cause the device to extract one or more features from a patch in an image of a scene, generate an initial prediction of a material category of the patch from candidate material categories based on the one or more features, identify a scene in the image, identify one or more objects in the image, obtain a first relationship model of two or more of the one or more features, the candidate material categories, the one or more objects, and the scene, and generate a refined prediction of the material category of the patch based on the initial prediction of the material category and on the first relationship model.

In one embodiment, one or more computer-readable media store instructions that, when executed by one or more computing devices, cause the one or more computing devices to perform operations comprising extracting one or more features from a patch in an image of a scene; generating an initial prediction of a material category of the patch from candidate material categories based on the one or more features; identifying one or more of a scene in the image and an object in the image; obtaining a first relationship model of two or more of the one or more features, the candidate material categories, and the one or more of the scene in the image and the object in the image; and generating a refined prediction of the material category of the patch based on the initial prediction of the material category and on the first relationship model.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
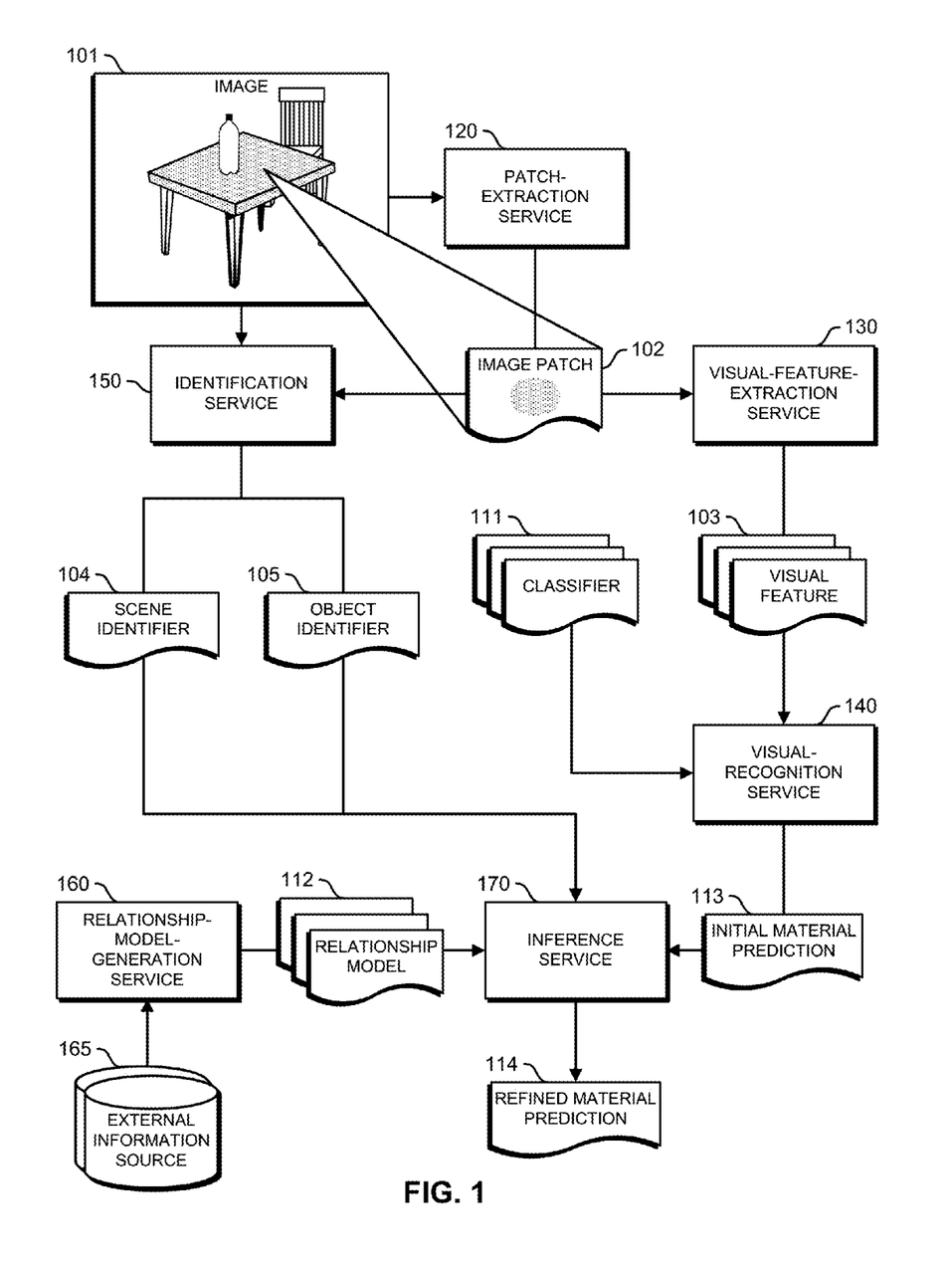
FIG. 1 illustrates an example embodiment of the flow of operations in a system for knowledge-based inference for material recognition.

FIG. 1 illustrates an example embodiment of the flow of operations in a system for knowledge-based inference for material recognition. An image 101, which depicts a scene, is obtained by a patch-extraction service 120. The patch-extraction service 120 and the other services described herein are implemented by one or more computing devices (e.g., a desktop computer, a laptop computer, a tablet computer, a smartphone, a server, and a personal digital assistant). The patch-extraction service 120 extracts an image patch 102 from the image 101. In some embodiments, the image patch 102 is selected by receiving a user input or is selected by a software program. The image patch 102 is then obtained by a visual-feature-extraction service 130 and by an identification service 150. The visual-feature-extraction service 130 extracts one or more visual features 103 (e.g., SIFT features, CHoG features, SURF features, GLOH features) from the image patch 102.

Next, the visual-recognition service 140 generates an initial material prediction 113 based on the one or more visual features 103 and on one or more classifiers 111. In some embodiments, the initial material prediction 113 is a confidence-rated prediction of the category of the material. In one example, the initial material prediction 113 of an image patch 102 is metal with a confidence of 0.5, granite with a confidence of 0.4, and wood with a confidence of 0.1. Also, the one or more classifiers 111 can be trained using a set of material patches with known material types.

Additionally, the identification service 150 obtains the material patch 102 and the image 101, and the identification service 150 then identifies one or more of the following: the scene (e.g., the setting or the context of an object, a place), the object that includes the image patch 102, and one or more other objects that do not include the image patch 102. In some embodiments, the identification service 150 first identifies any objects (e.g., the object that includes the image patch 102, other objects), then the identification service 150 identifies the scene based at least in part on the objects. The identification service also generates a scene identifier 104 that identifies the scene or respective object identifiers 105 that identify the object that includes the image patch 102 and the other objects.

The system also includes a relationship-model-generation service 160. The relationship-model-generation service 160 obtains information from external information sources 165 and generates one or more relationship models 112 based on the obtained information.

Also, the inference service 170 obtains the initial material prediction 113, the scene identifier 104, the one or more object identifiers 105, and the one or more relationship models 112, and uses them to generate a refined material prediction 114.

Figure 2:
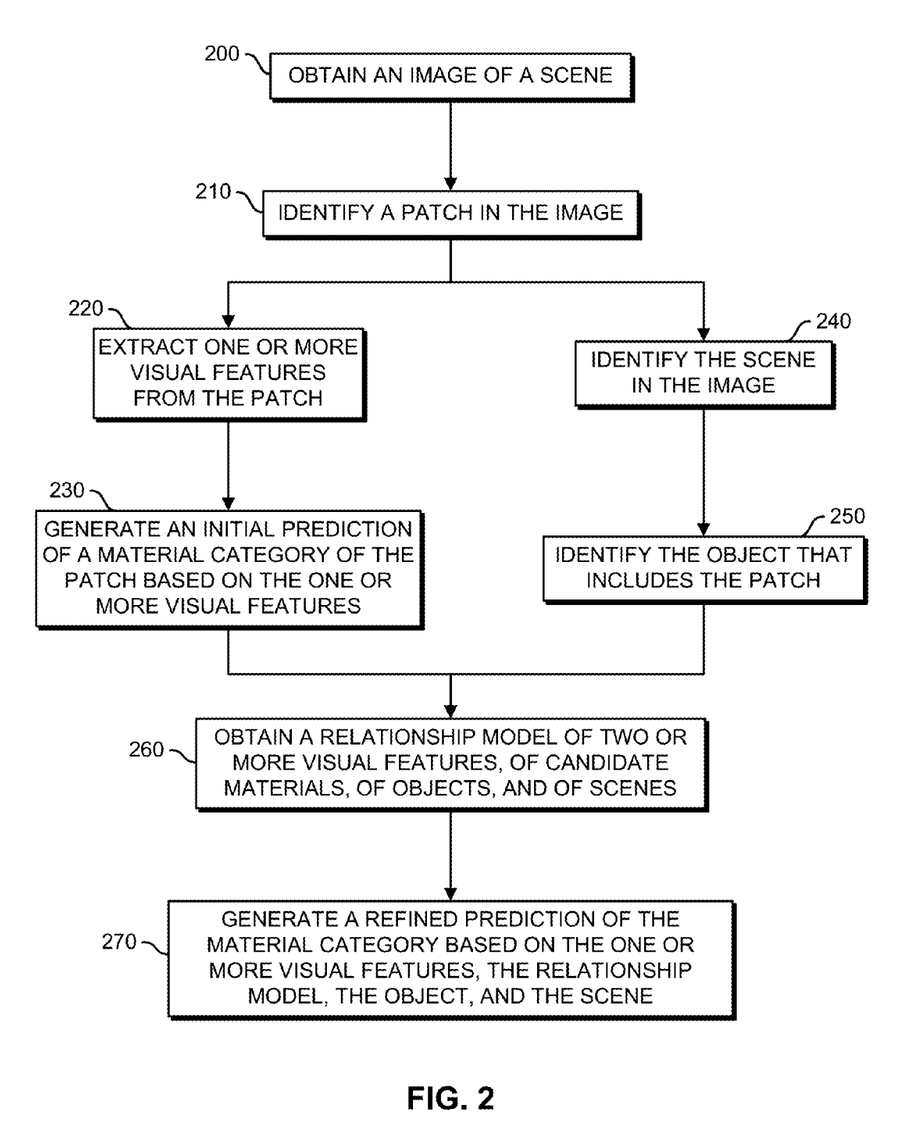
FIG. 2 illustrates an example embodiment of an operational flow for inferential material recognition.

FIG. 2 illustrates an example embodiment of an operational flow for inferential material recognition. The blocks of this operational flow and the other operational flows that are described herein may be performed by one or more computing devices, for example the computing devices described herein. Also, although this operational flow and the other operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows that are described herein may omit blocks, add blocks, change the order of the blocks, combine blocks, or divide blocks into more blocks.

The flow starts in block 200, where an image of a scene is obtained, for example by a system for knowledge-based inference for material recognition. The flow then moves to block 210, where a patch in the image is identified. For example, the patch may be identified by an automated process that does not receive user input to identify the patch, or the patch may be identified, at least in part, by receiving user input.

The flow then splits into a first flow and a second flow. The first flow proceeds to block 220. In block 220, one or more visual features (e.g., Texton features, LBP features, SIFT features, and OpenSurface features) are extracted from the patch. From block 220, the first flow then proceeds to block 230, where an initial prediction of a material category of the patch is generated based on the one or more visual features. For example, some embodiments take the extracted visual features and use one or more classifiers to produce a confidence-rated initial prediction of the category of the material. From block 230, the first flow then proceeds to block 260.

Also, from block 210, the second flow proceeds to block 240. In block 240, the scene in the image is identified. Next, in block 250, the object that includes the patch is identified. The second flow then proceeds to block 260, where the second flow joins the first flow.

In block 260, a relationship model of two or more of the visual features, of candidate materials, of objects, and of scenes is obtained. In the human visual recognition process, non-visual knowledge may play an important role. For example, visual recognition of the material in an image of a countertop can be very challenging due to the resemblance of the material to metal, granite, and marble. However, if extra information is available, the extra information may be used to better infer the category of the material. Thus, if an unknown material is part of a countertop, one can expect it to more likely be wood or granite.

Figure 3A:
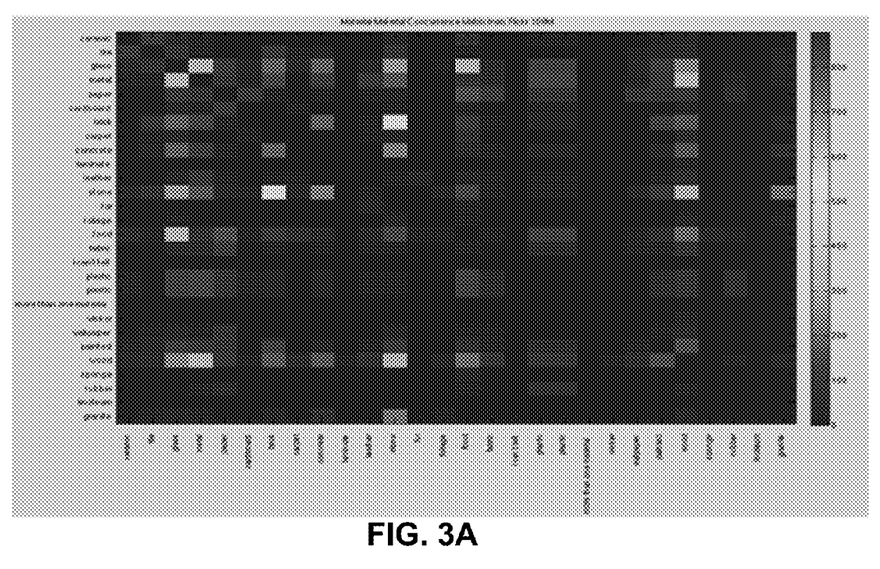
FIGS. 3A and 3B illustrate example embodiments of co-occurrence matrixes.

To generate the relationship model, some embodiments perform knowledge extraction and material-object-scene modeling. In knowledge extraction, some embodiments extract information from heterogeneous information sources, such as web image annotations and search results. For example, some embodiments extract co-occurrence counts of all combinations of materials, objects, and scene names from two sources: search results and a public data set of annotations of 100 million images. These embodiments may then generate one or more co-occurrence matrixes, for example the co-occurrence matrixes shown in FIG. 3A and FIG. 3B. From a co-occurrence matrix, some information can be easily identified. For example, in FIG. 3B, the strong correlations of the material "stone," the material "brick," and the material "food" to the scene "kitchen" is readily apparent.

Figure 4A:
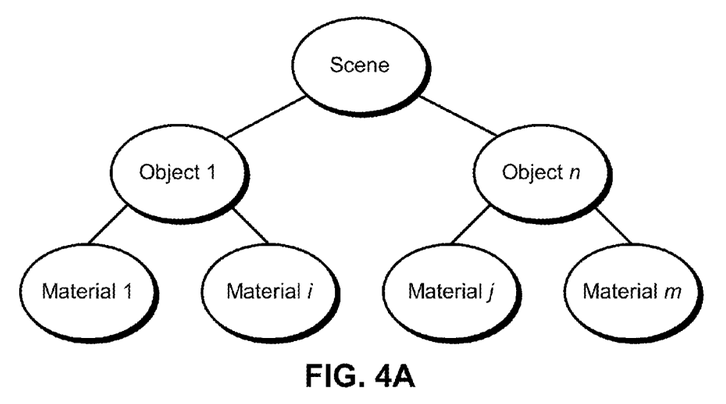
FIGS. 4A, 4B, 4C, and 4D illustrate example embodiments of relationship-model graphs.
Figure 4B:
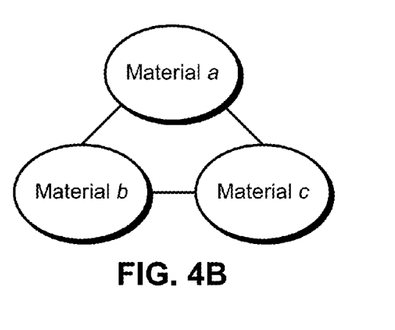
Figure 4C:
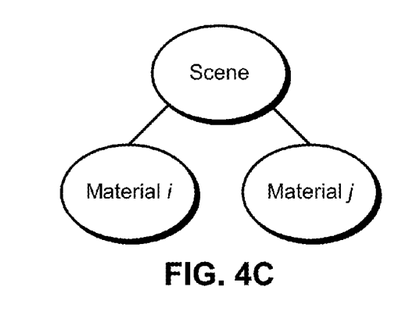
Figure 4D:
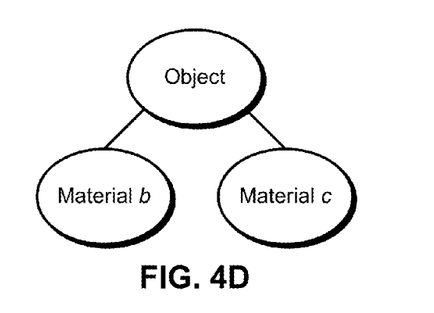

In material-object-scene modeling, some embodiments model visual features of patches of materials, the objects, and the scene of the same image as nodes in an undirected graph. Depending on the embodiment (e.g., on the data and the application of the embodiment), multiple graphical models can be generated to represent the inter-relationship of materials, objects, and scenes. FIGS. 4A, 4B, 4C, and 4D illustrate example embodiments of relationship-model graphs. The graph in FIG. 4A models the full generative relationships of materials, objects, and a scene. FIG. 4B models the relationships of different materials. FIG. 4C models the relationships of materials and a scene. And FIG. 4D models the relationships of materials and an object.

Figure 5A:
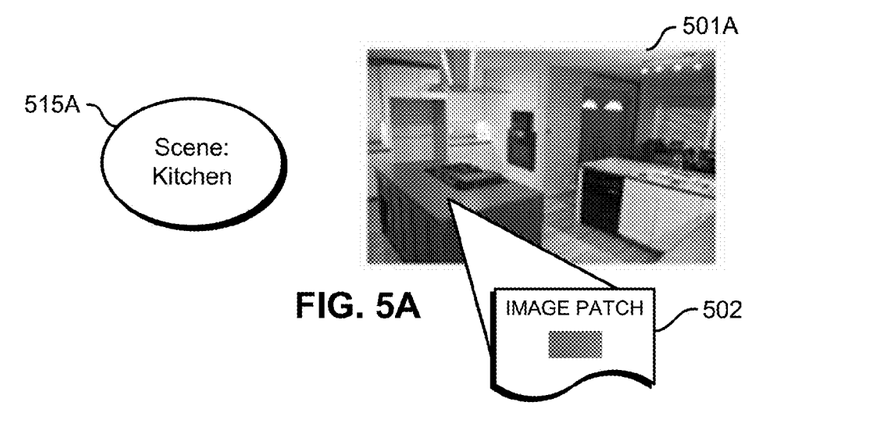
FIG. 5A illustrates an example embodiment of an image of a scene.
Figure 5B:
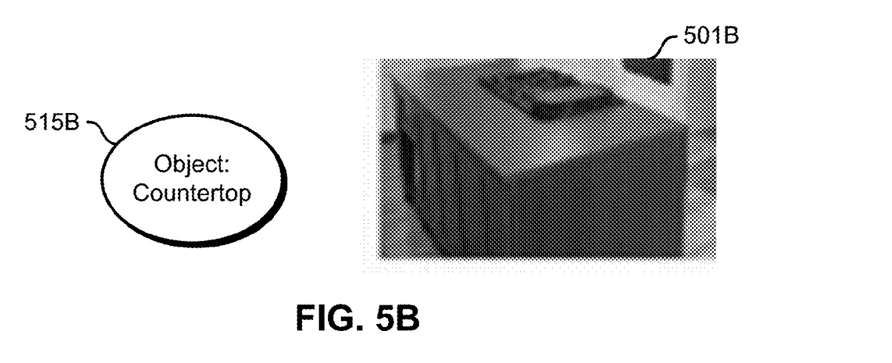
FIG. 5B illustrates an example embodiment of an image of an object.
Figure 5C:
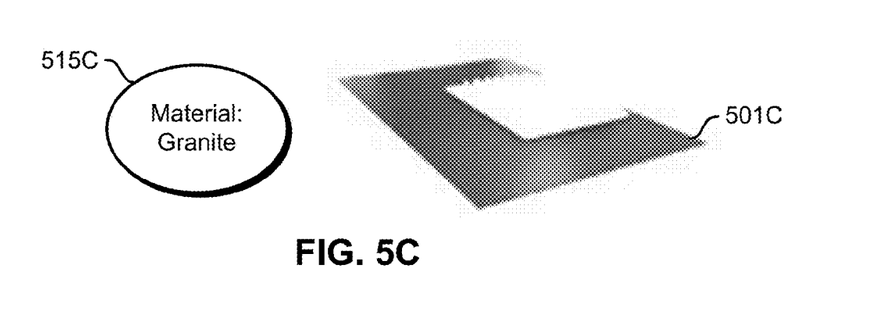
FIG. 5C illustrates an example embodiment of an image of a material.

Also, FIG. 5A illustrates an example embodiment of an image 501A of a scene, which is a kitchen. Also, FIG. 5A shows an example of a corresponding scene node 515A, which is generated or included in some embodiments that use a graph-based relationship model. Additionally, FIG. 5B illustrates an example embodiment of an image 501B of an object, which is a counter. FIG. 5B also illustrates an example embodiment of a corresponding object node 515B. And FIG. 5C illustrates an example embodiment of an image 501C of a material, which is granite, and a corresponding material node 515C.

Referring again to FIG. 2, from block 260 the flow proceeds to block 270, where a refined prediction of the material category is generated based on the one or more visual features, the relationship model, the object (e.g., by using a corresponding object node in some embodiments that use a node-based relationship model), and the scene (e.g., by using a corresponding scene node in some embodiments that use a node-based relationship model). The refined prediction can be calculated using graphical-model-based-inference methods, such as SumMax and Loopy Belief Propagation. Some embodiments exploit knowledge encoded in the co-occurrences by using normalized correlations as priors. For example, the prior of an image patch with the i-th material category occurring in an image with the j-th scene category can be calculated as follows:

$$P(\text{material}_i \mid \text{scene}_j) = \frac{MS_{i,j}}{\sum_{m=1}^{M} MS_{m,j}},$$

where $MS_{i,j}$=# of co-occurrence count of $<\text{material}_i, \text{scene}_j>$ and where $M$=# of material categories.

The initial predictions can be used as the probability of each image patch belonging to certain material category, for example according to the following:

$$P(\text{material}_{ik} \mid \text{patch}_k) = \frac{MP_{i,k}}{\sum_{m=1}^{M} MP_{m,k}},$$

where $MP_{i,k}$=prediction confidence of $\text{patch}_k$ belonging to material.

By jointly modeling material patches in the image, some embodiments obtain the final prediction of the category of material patch k according to the following equation:

argmax $P(\text{material}_{ik}|\text{patch}_1, \ldots, \text{patch}_k, \text{object}_1, \ldots, \text{object}_o, \text{scene})$.

Inference of the relationship model depends on the configuration of the relationship model. For tree-structured relationship models, such as FIGS. 4A, 4C, and 4D, some embodiments obtain the exact inference via the max-product algorithm. For cyclic relationship models, such as FIG. 4B, some embodiments obtain the approximate inference via Loopy Label Propagation.

Furthermore, the joint integration of multiple relationship models and heterogeneous data sources can greatly improve the robustness of knowledge-based inference. Some embodiments combine the predictions based on the weights learned from the training data set or from a set that is based on user experience as follows:

$$h = \sum_{i=1}^{n} \alpha_i h_i,$$

where $$\alpha_i = \frac{\log \frac{1-e_i}{e_i} - \log(M-1)}{\sum_{i=1}^{n} \left( \log \frac{1-e_i}{e_i} - \log(M-1) \right)},$$

and where $h_i$: refined prediction from the $i$-th model.

Thus, referring again to FIG. 5, some embodiments of the systems, methods, and devices obtain a selection of an image patch 502 in the image 501A of the scene. The embodiments extract one or more visual features from the image patch 502 and generate an initial material prediction based on the visual features and on one or more classifiers. In this example, the initial material prediction is metal with a confidence of 0.4, granite with a confidence of 0.3, and wood with a confidence of 0.3.

Also, the embodiments identify the object that includes the image patch 502 as a countertop. The embodiments also identify the other objects in the scene, which include a sink, a range, a dishwasher, and cabinets. The embodiments then identify the scene, which is a kitchen, based on the objects. Next, the embodiments obtain one or more relationship models, at least one of which includes the scene node 515A, the object node 515B, and the material node 515C. Based on the one or more relationship models, the scene, the objects, and the initial material prediction, the embodiments generate a refined material prediction. In this example, the refined material prediction is granite with a confidence of 0.6, metal with a confidence of 0.2, and wood with a confidence of 0.2.

Figure 6:
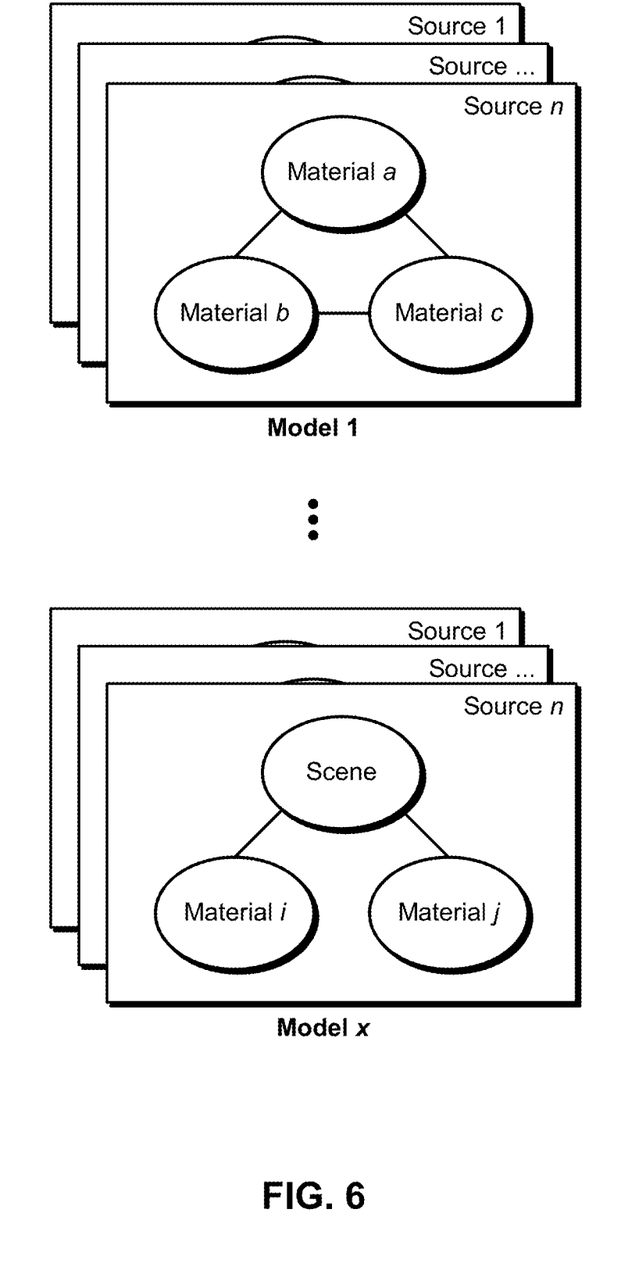
FIG. 6 illustrates example embodiments of relationship models.

FIG. 6 illustrates an example embodiment of relationship models that are generated by some embodiments of the devices, systems, and methods that are described herein. These embodiments of the devices, systems, and methods generate multiple relationship models, model 1 to model x, from multiple sources of information, source 1 to source n. In this embodiment, a first relationship model, model 1, is a cyclic relationship model of materials. Other models of relationships are generated, including model x, which is a tree-structured model of scenes and materials. Thus, the relationship models may include different types of relationship models.

Figure 7:
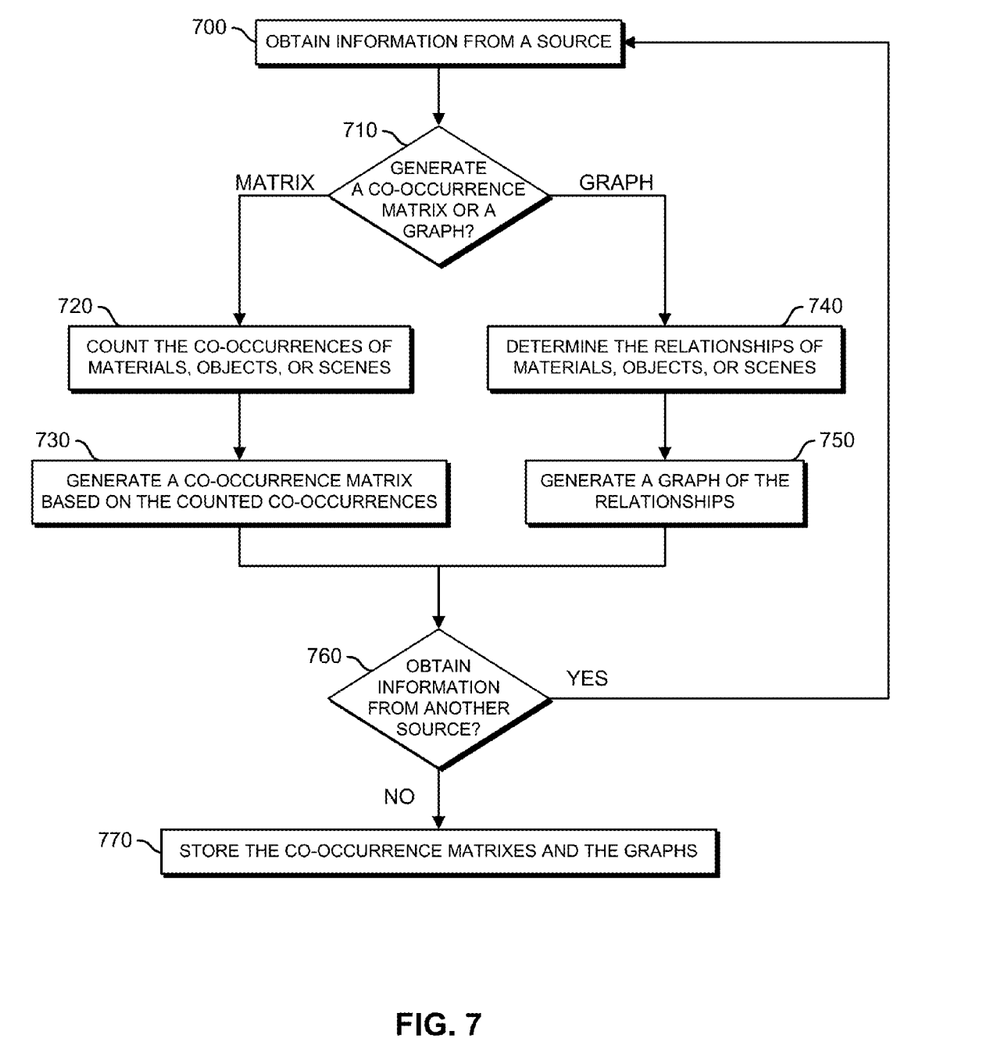
FIG. 7 illustrates an example embodiment of an operational flow for generating relationship models.

FIG. 7 illustrates an example embodiment of an operational flow for generating relationship models. The flow starts in block 700, where information is obtained from a source (e.g., an external source such as a computing cloud, a server, an external hard drive, a website). Next, in block 710, it is determined if a co-occurrence matrix or a graph is to be generated. If a co-occurrence matrix is to be generated, then the flow moves to block 720, where at least one of the following co-occurrences is counted: a material and another material, a material and an object, a material and a scene, and an object and a scene. The flow then proceeds to block 730, where a co-occurrence matrix is generated based on the counted co-occurrences. After block 730, the flow then moves to block 760.

If in block 710 it is determined that a graph is to be generated, then the flow moves to block 740, where at least one of the following relationships is determined: a material to another material, a material to an object, a material to a scene, and an object to a scene. Next, in block 750, one or more graphs are generated based on the determined relationship or relationships. After block 750, the flow then moves to block 760.

In block 760, it is determined if information is to be obtained from another source. If yes (block 760=yes), then the flow returns to block 700. If not (block 760=no), then the flow proceeds to block 770. In block 770, any generated co-occurrence matrixes and graphs are stored.

Figure 8:
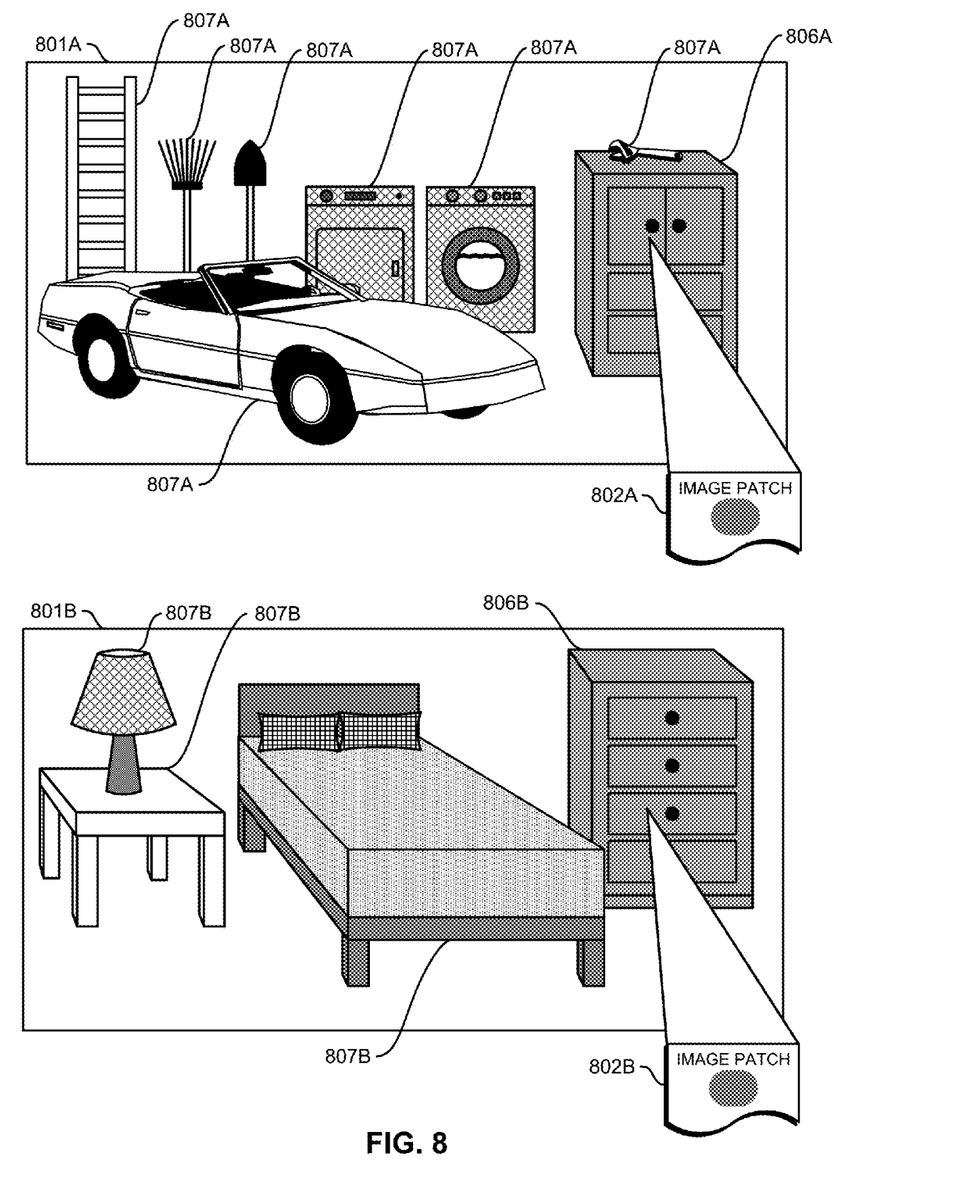
FIG. 8 illustrates example embodiments of images.

FIG. 8 illustrates example embodiments of images. The scene in the first image 801A is a garage. The scene in the second image 801B is a bedroom. In some embodiments of the systems, methods, and devices, a selection of an image patch 802A in the first image 801A is obtained. The embodiments extract one or more visual features from the image patch 802A and generate an initial material prediction based on the visual features and on one or more classifiers. In this example, the image patch 802A is silver with a smooth texture, and the initial material prediction is metal with a confidence of 0.5, painted with a confidence of 0.4, and wood with a confidence of 0.1.

Figure 3B:
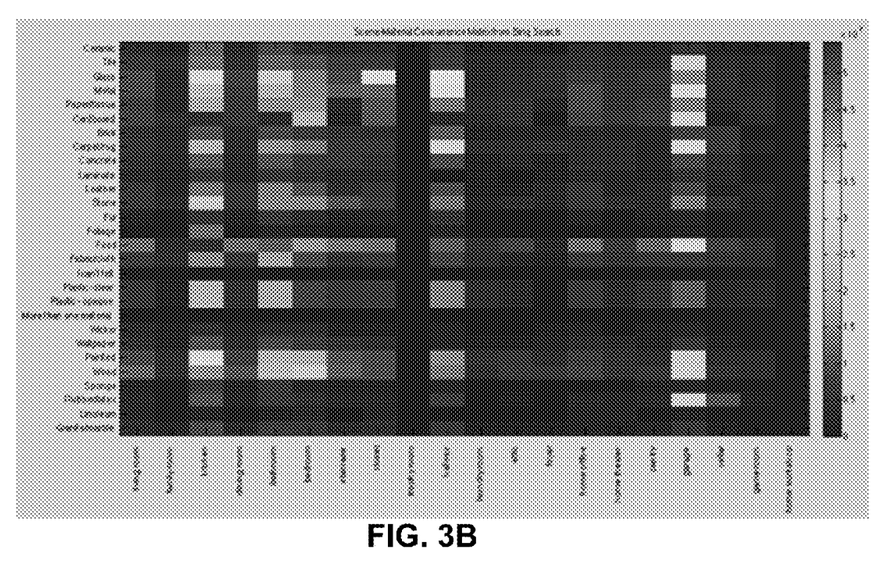

Also, the embodiments identify the object 806A that includes the image patch 802A as a chest that includes drawers. The embodiments also identify the other objects 807A, which include an automobile, a ladder, a rake, a shovel, a dryer, a washing machine, and a wrench. The embodiments then identify the scene, which is a garage, based on the objects. Next, the embodiments obtain one or more relationship models, which include the co-occurrence matrix in FIG. 3B in this example. Based on the relationship models, the scene, the objects, and the initial material prediction, the embodiments generate a refined material prediction. Because the co-occurrence matrix in FIG. 3B shows that metal has a slightly higher co-occurrence with a garage than painted and wood, the refined material prediction is metal with a confidence of 0.6, painted with a confidence of 0.3, and wood with a confidence of 0.1.

Furthermore, if the embodiments use a relationship model that shows that metal and wood are strongly correlated with chests that include drawers and painted is not, the refined material prediction may be metal with a confidence of 0.7, painted with a confidence of 0.1, and wood with a confidence of 0.2.

Additionally, if a selection of an image patch 802B in the second image 801B is obtained, then the embodiments extract one or more visual features from the image patch 802B and generate an initial material prediction based on the visual features and on one or more classifiers. In this example, the image patch 802B is silver with a slightly rough texture, and the initial material prediction is metal with a confidence of 0.5, painted with a confidence of 0.4, and wood with a confidence of 0.1.

Again, the embodiments identify the object 806B that includes the image patch 802B as a chest that includes drawers. The embodiments also identify the other objects 807B, which include a table, a lamp, and a bed. The embodiments then identify the scene, which is a bedroom, based on the objects. Next, the embodiments obtain one or more relationship models, which again include the co-occurrence matrix in FIG. 3B. Based on the relationship models, the scene, the objects, and the initial material prediction, the embodiments generate a refined material prediction. Because the co-occurrence matrix in FIG. 3B shows that painted and wood have a higher co-occurrence with bedroom than metal, the refined material prediction is painted with a confidence of 0.5, wood with a confidence of 0.3, and metal with a confidence of 0.2.

Furthermore, if the embodiments use a relationship model that shows that metal and wood are strongly correlated with chests that include drawers and painted is not, the refined material prediction may be wood with a confidence of 0.5, metal with a confidence of 0.3, and painted with a confidence of 0.2. However, if the embodiments use a relationship model that shows that wood and painted are more strongly correlated with chests that include drawers than metal, the refined material prediction may be painted with a confidence of 0.5, wood with a confidence of 0.4, and metal with a confidence of 0.1.

Therefore, the embodiments of the devices, systems, and methods, may generate a material prediction that is based on more than the visual appearance of an image patch. Thus, even if two image patches are the same or similar, these embodiments may generate different material predictions for the image patches.

Figure 9:
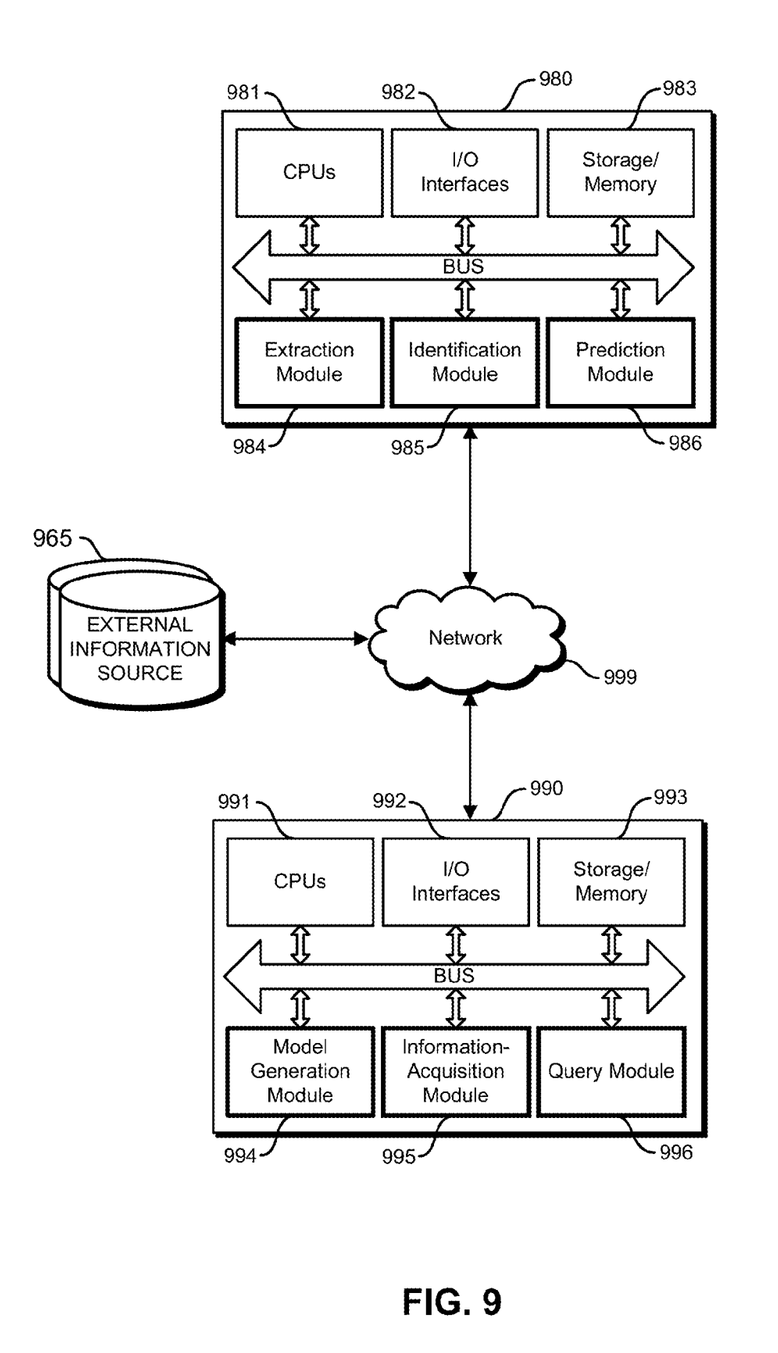
FIG. 9 illustrates an example embodiment of a system for knowledge-based inference for material recognition.

FIG. 9 illustrates an example embodiment of a system for knowledge-based inference for material recognition. The system includes a prediction-generation device 980, a model-generation device 990, and one or more external information sources 965. In this embodiment, the devices communicate by means of one or more networks 999, which may include a wired network, a wireless network, a LAN, a WAN, a MAN, and PAN, etc. In some embodiments, the devices communicate by means of other wired or wireless channels.

The prediction-generation device 980 includes one or more processors (CPUs) 981, one or more I/O interfaces 982, and storage/memory 983. The CPUs 981 include one or more central processing units, which include microprocessors (e.g., a single core microprocessor, a multi-core microprocessor) or other circuits, and the CPUs 981 are configured to read and perform computer-executable instructions, such as instructions in storage, in memory, or in a module.

The I/O interfaces 982 include communication interfaces to input and output devices, which may include a keyboard, a display, a mouse, a printing device, a touch screen, a light pen, an optical-storage device, a scanner, a microphone, a camera, a drive, a controller, and a network (either wired or wireless).

The storage/memory 983 includes one or more computer-readable or computer-writable media, for example a computer-readable storage medium. As used herein, a transitory computer-readable medium refers to a mere transitory, propagating signal, and a non-transitory computer-readable medium refers to a computer-readable medium that is not merely a transitory, propagating signal. Also, a computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 983 can store computer-readable data or computer-executable instructions. The components of the prediction-generation device 980 communicate via a bus.

The prediction-generation device 980 also includes an extraction module 984, an identification module 985, and a prediction module 986. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules.

The extraction module 984 includes instructions that, when executed, or circuits that, when activated, cause the prediction-generation device 980 to extract an image patch from an image (e.g., based on user input, based on an automated process) or to extract one or more visual features from the image patch. In some embodiments, the extraction module 984 includes instructions that, when executed, or circuits that, when activated, cause the prediction-generation device 980 to implement a patch-extraction service or a visual-feature-extraction device.

The identification module 985 includes instructions that, when executed, or circuits that, when activated, cause the prediction-generation device 980 to identify a scene in an image and generate a corresponding scene identifier; to identify an object, which is in a image, that includes an image patch and generate a corresponding object identifier; and to identify one or more other objects in an image and to generate one or more corresponding object identifiers. In some embodiments, the identification module 985 includes instructions that, when executed, or circuits that, when activated, cause the prediction-generation device 980 to implement an identification service.

The prediction module 986 includes instructions that, when executed, or circuits that, when activated, cause the prediction-generation device 980 to generate an initial material prediction based on one or more visual features and on one or more classifiers or to generate a refined material prediction based on at least some of the following: an initial material prediction, one or more relationship models, a scene identifier, and one or more object identifiers. In some embodiments, the prediction module 986 includes instructions that, when executed, or circuits that, when activated, cause the prediction-generation device 980 to implement one or more of a visual-recognition service and an inference service.

The model-generation device 990 includes one or more processors (CPUs) 991, one or more I/O interfaces 992, storage/memory 993, a model-generation module 994, an information-acquisition module 995, and a query module 996. The model-generation module 994 includes instructions that, when executed, or circuits that, when activated, cause the model-generation device 990 to generate one or more relationship models based on information that was obtained from one or more external information sources 965. In some embodiments, the model-generation module 994 includes instructions that, when executed, or circuits that, when activated, cause the model-generation device 990 to implement a relationship-model-generation service.

The information-acquisition module 995 includes instructions that, when executed, or circuits that, when activated, cause the model-generation device 990 to obtain information from one or more external information sources 965. And the query module 996 includes instructions that, when executed, or circuits that, when activated, cause the model-generation device 990 to send generated relationship models to the prediction-generation device 980.

The above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

Furthermore, some embodiments use one or more functional units to implement the above-described devices, systems, and methods. The functional units may be implemented in hardware alone (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method comprising:
   extracting one or more features from a patch in an image of a scene;
   generating an initial prediction of a material category of the patch from candidate material categories based on the one or more features;
   identifying a scene in the image;
   identifying one or more objects in the image;
   obtaining a first relationship model of two or more of the one or more features, the candidate material categories, the one or more objects, and the scene; and
   generating a refined prediction of the material category of the patch based on the initial prediction of the material category and on the first relationship model.

2. The method of claim 1, wherein generating the refined prediction of the material category of the patch is further based on the scene in the image and on the one or more objects in the image.

3. The method of claim 1, further comprising:
   obtaining a second relationship model of two or more of the one or more features, the candidate material categories, the one or more objects, and the scene; wherein
   generating the refined prediction of the material category of the patch is further based on the second relationship model.

4. The method of claim 1, further comprising:
   obtaining multiple relationship models, wherein each of the multiple relationship models respectively defines relationships of two or more of
   the one or more features, the candidate material categories, the one or more objects, and the scene; and
   integrating the multiple relationship models, thereby generating an integrated relationship model, wherein
   generating the refined prediction of the material category of the patch is further based on the integrated relationship model.

5. The method of claim 1, wherein obtaining the first relationship model includes
   extracting statistical characteristics of the candidate material categories, of the one or more objects, and of the scene from one or more databases; and
   generating one or more probabilistic models of the candidate material categories, of the one or more objects, and of the scene that model correlations of the candidate material categories, of the one or more objects, and of the scene.

6. The method of claim 1, wherein the first relationship model describes correlations of materials and scenes.

7. The method of claim 1, wherein the first relationship model describes correlations of materials and objects.

8. The method of claim 1, wherein the first relationship model describes correlations of materials and other materials.

9. The method of claim 1, wherein the first relationship model describes correlations of scenes and objects.

10. A computing device comprising:
    one or more computer-readable media; and
    one or more processors that are coupled to the one or more computer-readable media and that are configured to cause the device to
    extract one or more features from a patch in an image of a scene,
    generate an initial prediction of a material category of the patch from candidate material categories based on the one or more features,
    identify a scene in the image,
    identify one or more objects in the image,
    obtain a first relationship model of two or more of the one or more features, the candidate material categories, the one or more objects, and the scene, and generate a refined prediction of the material category of the patch based on the initial prediction of the material category and on the first relationship model.

11. The computing device of claim 10, wherein the one or more processors are configured to cause the device to generate the refined prediction of the material category of the patch further based on the scene or on the one or more objects in the scene.

12. The computing device of claim 10, wherein the first relationship model is a co-occurrence matrix.

13. The computing device of claim 10, wherein the initial prediction is a confidence-based prediction.

14. The computing device of claim 10, wherein the one or more processors are configured to cause the device to obtain a second relationship model of two or more of the one or more features, the candidate material categories, the one or more objects, and the scene, wherein the second relationship model is different from the first relationship model; and wherein the one or more processors are configured to cause the device to generate the refined prediction of the material category of the patch further based on the second relationship model.

15. One or more non-transitory computer-readable media storing instructions that, when executed by one or more computing devices, cause the one or more computing devices to perform operations comprising:

extracting one or more features from a patch in an image of a scene;

generating an initial prediction of a material category of the patch from candidate material categories based on the one or more features;

identifying one or more of a scene in the image and an object in the image;

obtaining a first relationship model of two or more of the one or more features, the candidate material categories, and the one or more of the scene in the image and the object in the image; and generating a refined prediction of the material category of the patch based on the initial prediction of the material category and on the first relationship model.

16. The one or more non-transitory computer-readable media of claim 15, wherein the operations further comprise:

obtaining a second relationship model of two or more of the one or more features, the candidate material categories, and the one or more of the scene in the image and the object in the image, wherein the second relationship model is different from the first relationship model; and wherein the refined prediction of the material category of the patch is further based on the second relationship model.

17. The one or more non-transitory computer-readable media of claim 15, wherein generating the initial prediction of a material category of the patch is further based on one or more classifiers.

* * * * *